Patented Oct. 29, 1929

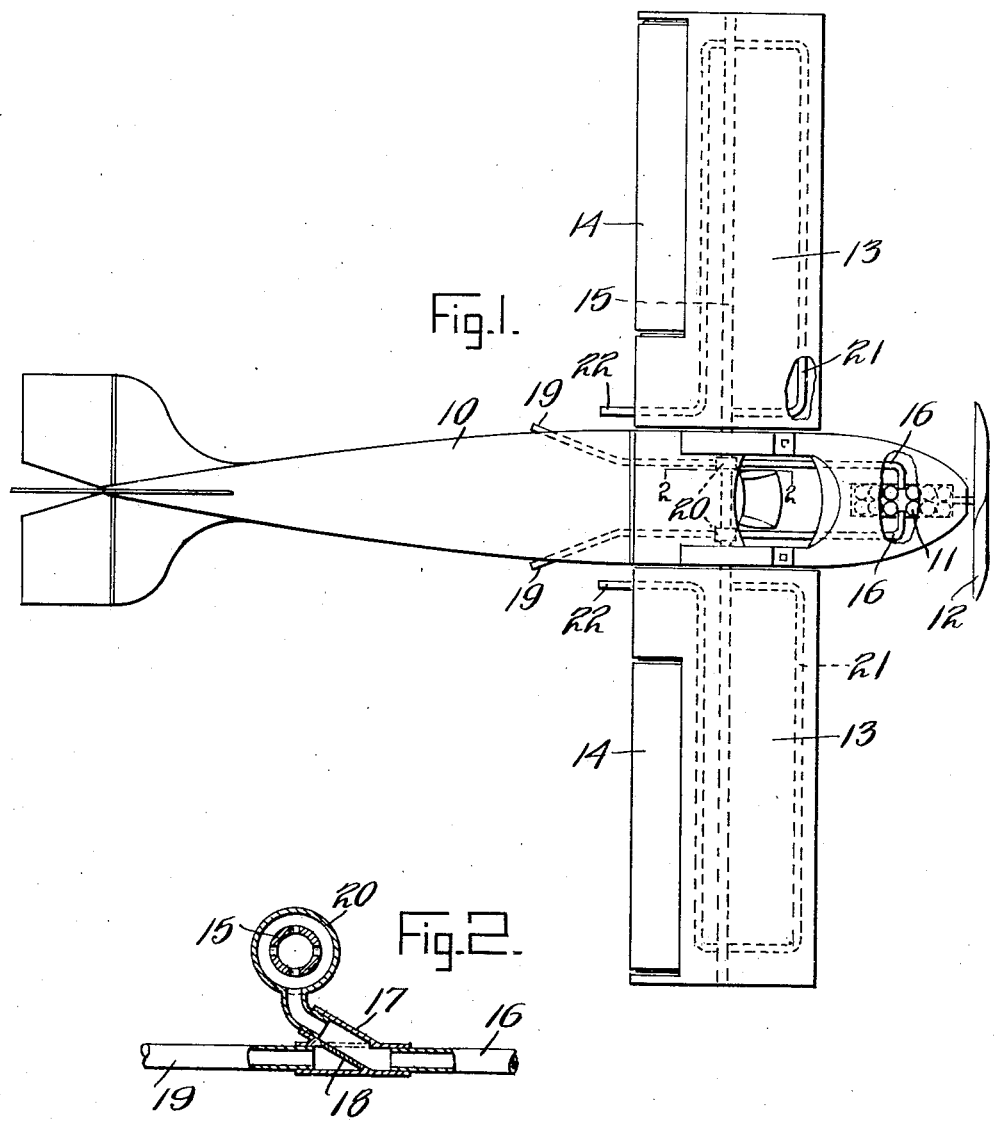

1,733,465

UNITED STATES PATENT OFFICE

DANIEL MORRIS, OF ST. PETERSBURG, FLORIDA

WING HEATER FOR AEROPLANES

Application filed July 31, 1928. Serial No. 296,589.

My invention relates to aeroplanes, dirigibles and other lighter than air machines, and it is an object of the invention to provide means for heating the wings and other portions of the machines in order to prevent the accumulation thereon of ice, frost or the like, all as will be hereinafter more particularly described and claimed.

Referring to the accompanying drawings, which are made a part hereof and on which similar reference characters indicate similar parts, Figure 1 is a top plan view, illustrating one application of my invention; and Figure 2 is a section on line 2—2 of Fig. 1.

In the drawings reference character 10 indicates the body or fuselage of an aeroplane provided with a motor 11 and propeller 12. The plane is also provided with a pair of wings 13, each being provided with an aileron 14. The wings 13 are mounted upon a hollow shaft 15 which extends longitudinally throughout the length of the wings from tip to tip, and in the present instance forms a pivotal support for the same. While I have described an aeroplane it will be understood that the invention may be applied to dirigibles and other lighter than air machines.

In order to prevent the accumulation of frost, ice and the like on the wings, I provide a connection 16 from the exhaust of the motor 11, which has communication with the shaft 15 through the instrumentality of a Y-shaped valved coupling 17, into the front end of which the pipe 16 extends. A valve 18 is provided in said coupling which may be operated to discharge the exhaust from the motor directly through discharge pipes 19, or through a casing 20 into the shaft 15. At each side of the fuselage in slightly spaced relation to the casing 20 is provided a conduit 21 which extends around the wing and terminates exteriorly of the wing and at the rear of the same in a discharge end 22, in close proximity to the fuselage. The pipes 15 and 21 extend through the wings and are covered with asbestos or the like to prevent setting fire to or damaging the wings.

From the above description, it will be readily understood that I have utilized heated exhaust gases which are ordinarily wasted, to heat the wings to prevent the accumulation of frost, snow, ice or the like on the wings, and thereby eliminated one of the great disadvantages in flying.

While I have shown an aeroplane having pivoted wings which are intended to be operated to form a brake for retarding the speed of the plane and for bringing the same out of a tail spin and the like, nevertheless, my device may be used upon any conventional type of aeroplane, dirigible or lighter than air machine.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. An aeroplane comprising a pair of wings, a hollow shaft forming a pivotal support for said wings, a heat conducting pipe extending through the wings and having a connection with the hollow shaft for heating the wings for preventing the accumulation of ice thereon, substantially as set forth.

2. An aeroplane comprising a pair of wings, a hollow shaft forming a pivotal support for said wings, a heat conducting pipe extending through the wings and having a connection with the hollow shaft for heating the wings for preventing the accumulation of ice thereon, and valved means for controlling the flow of heated gas to the wings, substantially as set forth.

3. An aeroplane comprising a pair of wings, a hollow shaft extending longitudinally of the said wings and forming a pivotal support therefor, a heat conducting pipe extending through the wings and having a connection with said hollow shaft for heating the wings, a casing about a portion of said hollow shaft, a connection between the exhaust and the casing said hollow shaft being perforated, whereby heated exhaust gases may pass into the hollow shaft and through the heat conducting pipes for heating the wings for preventing the accumulation of ice thereon, substantially as set forth.

In witness whereof, I have hereunto set my hand, at St. Petersburg, Florida, this 20th day of July, A. D. nineteen hundred and twenty-eight.

DANIEL MORRIS.